United States Patent
Zhuang et al.

(10) Patent No.: US 10,422,883 B2
(45) Date of Patent: Sep. 24, 2019

(54) POSITIONING METHOD USING HEIGHT-CONSTRAINT-BASED EXTENDED KALMAN FILTER

(71) Applicant: Southeast University, Nanjing (CN)

(72) Inventors: Yuan Zhuang, Nanjing (CN); Jinfeng Ma, Nanjing (CN); Longning Qi, Nanjing (CN); Xinning Liu, Nanjing (CN); Jun Yang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 16/309,939

(22) PCT Filed: Jun. 27, 2016

(86) PCT No.: PCT/CN2016/087287

§ 371 (c)(1),
(2) Date: Dec. 14, 2018

(87) PCT Pub. No.: WO2017/215026

PCT Pub. Date: Dec. 21, 2017

(65) Prior Publication Data

US 2019/0146095 A1 May 16, 2019

(30) Foreign Application Priority Data

Jun. 16, 2016 (CN) .......................... 2016 1 0432153

(51) Int. Cl.
*G01S 19/40* (2010.01)
*G01S 19/42* (2010.01)
*G01S 19/37* (2010.01)

(52) U.S. Cl.
CPC .............. *G01S 19/40* (2013.01); *G01S 19/37* (2013.01); *G01S 19/42* (2013.01)

(58) Field of Classification Search
CPC ........... G01S 19/37; G01S 19/40; G01S 19/42
See application file for complete search history.

(56) References Cited

U.S. PATENT DOCUMENTS

| 6,670,916 B2 * | 12/2003 | Edwards | ................. G01S 19/42 |
| | | | 342/357.64 |
| 2013/0249733 A1 * | 9/2013 | MacGougan | ........... G01S 19/47 |
| | | | 342/357.23 |

FOREIGN PATENT DOCUMENTS

| CN | 101561496 A | 10/2009 |
| CN | 102928858 A | 2/2013 |

(Continued)

OTHER PUBLICATIONS

Tang Yonggang et. al, RDSS/SINS Tightly Coupled Integrated Navigation System for Land Vehicles, Electronics Optics & Control, Apr. 30, 2007, p. 56, vol. 14, No. 2.

*Primary Examiner* — Dale Moyer
(74) *Attorney, Agent, or Firm* — Gokalp Bayramoglu

(57) ABSTRACT

A positioning method using height-constraint-based extended Kalman filter, suitable for a GNSS navigation and positioning system, comprises: obtaining an estimated state value of a current epoch by using an extended Kalman filter algorithm and according to an estimated state value of a previous epoch; constraining a positioning height of the current epoch by establishing a height constraint condition, so as to obtain an optimum estimated value of the current epoch and a corresponding mean square error, wherein the optimum estimated value satisfies the height constraint condition; further correcting the estimated state value by using a pseudorange obtained from the mean square error and a measured Doppler shift residual to obtain a final estimated state value of the current epoch, thus more accurately obtaining positioning information of a target to be (Continued)

positioned in the current epoch and enhancing the accuracy of GNSS navigation and positioning.

4 Claims, 2 Drawing Sheets

(56) References Cited

FOREIGN PATENT DOCUMENTS

| | | | |
|---|---|---|---|
| CN | 104035110 | A | 9/2014 |
| CN | 104316943 | A | 1/2015 |
| CN | 105510942 | A | 4/2016 |

* cited by examiner

POSITIONING METHOD USING HEIGHT-CONSTRAINT-BASED EXTENDED KALMAN FILTER

CROSS REFERENCE TO RELATED APPLICATIONS

This application is the national phase entry of International Application No. PCT/CN2016/087287, filed on Jun. 27, 2016, which is based upon and claims priority to Chinese Patent Application No. 201610432153.2, filed on Jun. 16, 2016, the entire contents of which are incorporated herein by reference.

TECHNICAL FIELD

The present invention relates to the satellite positioning field, and in particular, to a positioning method using height-constraint-based extended Kalman filter.

BACKGROUND

A Kalman filter algorithm can be used to perform optimum estimation on a state of a linear white Gaussian noise system, and is widely used in GNSS positioning and navigation. For the Kalman filter algorithm, a state equation is first utilized to predict states of a receiver, for example, a current position, speed, and clock error, then pseudorange and Doppler shift values of each satellite are predicted according to estimated state values and satellite positions and speeds provided by a satellite ephemeris, and finally a corrected optimum estimated value is obtained by processing measured residuals. After a new measured value is obtained each time, the Kalman filter algorithm may be used to update an estimated state value of the system once, and becomes an effective method for improving real-time GNSS navigation and positioning.

In a conventional Kalman filter positioning method, auxiliary devices such as a sensor and a barometer and a Kalman filter algorithm having a heading constraint and a speed constraint are usually used to improve the positioning accuracy of a height of a GNSS. In these methods, a peripheral is used, or information such as a heading and a real-time speed needs to be known. Consequently, costs of satellite positioning are increased.

SUMMARY

Objective of the Invention

To resolve a problem of dramatic change in a height direction of satellite positioning, the present invention provides a positioning method using height-constraint-based extended Kalman filter, to improve accuracy of GNSS navigation and positioning without using external auxiliary information and an external sensor device.

Technical Solution

To achieve the objective, the positioning method using height-constraint-based extended Kalman filter in the present invention includes the following steps:
(1) estimate a prior estimated state value $\hat{x}_k^-$ of a target to be positioned of a current epoch and a mean square error $P_k^-$ of the prior estimated state value of the current epoch by using a prediction formula and according to a final estimated state value $\hat{x}_{k-1}$ of a previous epoch and a mean square error $P_{k-1}$ of the final estimated state value of the previous epoch;
(2) construct a height constraint condition, and obtain, by using a minimum mean square error principle, an optimum estimated value $\hat{x}_k^\sim$ of the current epoch under the height constraint condition and a mean square error $P_k^\sim$ of the optimum estimated value; and
(3) correct the optimum estimated value $\hat{x}_k^\sim$ of the current epoch and the mean square error $P_k^\sim$ of the optimum estimated value by using a Kalman filter gain matrix $K_k$, to obtain a final estimated state value $\hat{x}_k$ of the current epoch and a mean square error matrix $P_k$ of the final estimated state value of the current epoch.

Advantageous Effect

According to the positioning method using height-constraint-based extended Kalman filter in the present invention, from a perspective of application, various scenarios of vehicle driving are fully considered. For a feature that a critical angle exists in the various scenarios, a climbing model without a peripheral sensor device is provided, so that the accuracy of satellite positioning can be increased, and a phenomenon of a dramatic change in a positioning height can be resolved.

DETAILED DESCRIPTION OF THE EMBODIMENTS

The following further explains the present invention with reference to the accompanying drawings.

Figure 1:
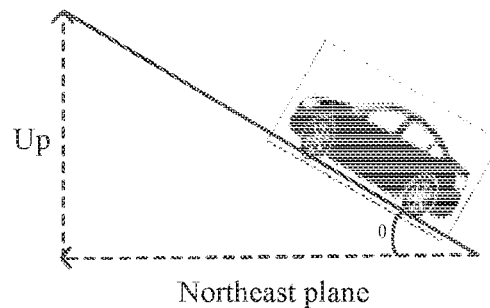
FIG. 1 is a schematic diagram of a user moving constraint model established according to the present invention.

In a positioning method using height-constraint-based extended Kalman filter in the present invention, a height constraint condition is established to optimize a conventional extended Kalman filter positioning method. A used climbing model is specifically described in this implementation. A vehicle is used as a target to be positioned. In an actual scenario, as shown in FIG. 1, when the vehicle is driven, an angle between a driving plane and a northeast plane is less than an angle, which is referred to as a critical angle θ. That is, an actual angle between the driving plane of the vehicle and the northeast plane is less than the critical angle. In this embodiment, the critical angle is set to 5°.

The height constraint condition may be obtained according to a trigonometric function relationship:

$$|U_k - U_{k-1}| \leq \sqrt{(N_k - N_{k-1})^2 + (E_k - E_{k-1})^2} \cdot \tan\theta \qquad (1).$$

In the formula (1), $E_k$ and $N_k$ respectively represent East and North coordinates of the target to be positioned in the $k^{th}$ epoch, Uk represents an Up coordinate of the target to be positioned in the $k^{th}$ epoch, and the East, North, and Up coordinates of the target to be positioned need to satisfy the height constraint condition.

In an extended Kalman filter positioning algorithm process, an obtained position of the target to be positioned is coordinates of a Earth-Centered Earth-fixed rectangular coordinate system, and is labeled as $(X_k[0], X_k[1], X_k[2])$. Corresponding East, North, and Up coordinates are labeled as $(E_k, N_k, U_k)$, where $E_k$, $N_k$, and $U_k$ respectively represent the East, North, and Up coordinates.

The Earth-Centered Earth-fixed rectangular coordinates $(X_k[0], X_k[1], X_k[2])$ to be converted into the East, North, and Up coordinates $(E_k, N_k, U_k)$ first needs to be converted into geodetic coordinates $(\varnothing, \lambda, h)$, and a transformation formula is:

$$\lambda = \arctan\left(\frac{X_k[1]}{X_k[0]}\right) \quad (2)$$

$$h = \frac{\sqrt{X_k[0]^2 + X_k[1]^2}}{\cos\phi} - N \quad (3)$$

$$\phi = \arctan\left[\frac{X_k[2]}{\sqrt{X_k[0]^2 + X_k[1]^2}}\left(1 - e^2\frac{N}{N+h}\right)\right]. \quad (4)$$

An ellipsoid mostly matching a geometry of the Earth is defined in a geodetic coordinate system, and is referred to as a reference ellipsoid. N is a radius of curvature in prime vertical, and e is an eccentricity of the ellipsoid.

The calculation formula (3) for h includes to-be-calculated $\varnothing$, but the formula (4) for $\varnothing$ reversely includes to-be-calculate h. Therefore, an iterative method is generally used to gradually approach and calculate values of $\varnothing$ and h. An iterative calculation process is as follows: first, it is assumed that an initial value of $\varnothing$ is 0, N, h, and $\varnothing$ are calculated in sequence by using the formulas (2), (3), and (4), and then just obtained 0 is reapplied to the foregoing three formulas, to update values of N, h, and $\varnothing$ again. Calculation may end after the iterative calculation is performed for three or four times.

A position of the target to be positioned in an East, North, and Up coordinate system is further calculated:

$$\Delta e = \Delta\lambda \cdot a \cdot \cos\phi \quad (5)$$

$$\Delta n = \Delta\phi \cdot a \quad (6)$$

$$\Delta u = \Delta h \quad (7)$$

where a is a major radius of the reference ellipsoid, $(\Delta\varnothing, \Delta\lambda, \Delta h)$ are differences between the geodetic coordinates of the target to be positioned in the $k^{th}$ epoch and the geodetic coordinates of the target to be positioned in the $(k-1)^{th}$ epoch, and $(\Delta e, \Delta n, \Delta n)$ are differences between the East, North, and Up coordinates of the target to be positioned in the $k^{th}$ epoch and the East, North, and Up coordinates of the target to be positioned in the $(k-1)^{th}$ epoch.

Figure 2:
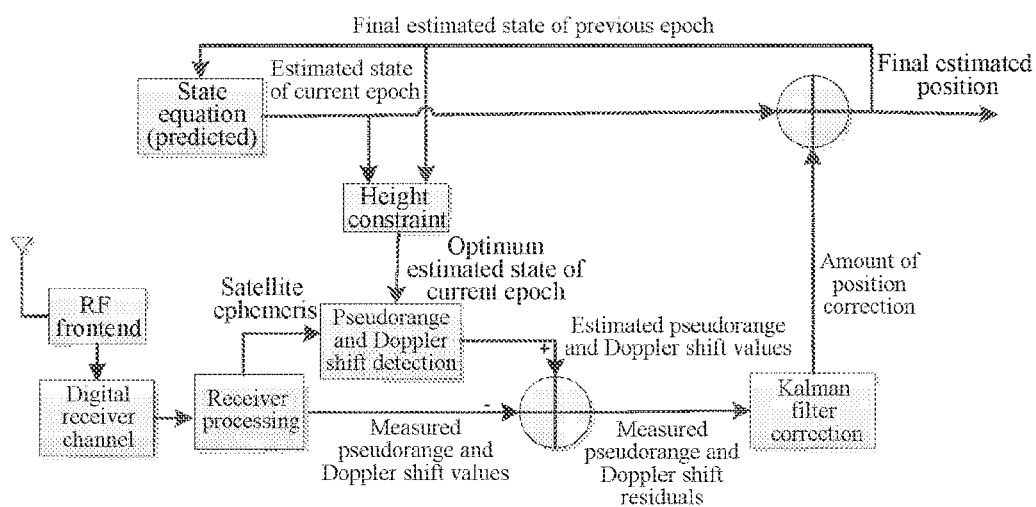
FIG. 2 is a flowchart of a positioning method using height-constraint-based extended Kalman filter according to the present invention.

Based on the height constraint condition, the positioning method using height-constraint-based extended Kalman filter in the present invention is specifically as follows: As shown in FIG. 2, in satellite positioning and navigation, a receiver located on a target to be positioned receives a satellite signal used for positioning. Data processing is performed on the received satellite signal, to obtain measured satellite ephemeris, pseudorange, and Doppler shift values required by Kalman positioning. In a Kalman positioning algorithm, an estimated state value of a next epoch is generally predicted by using a state equation and according to an estimated state value of a previous epoch. In the present invention, the height constraint condition is added in this process, and an estimated state obtained by using the Kalman positioning algorithm is corrected by using measured residuals between the measured pseudorange and Doppler shift values obtained by the receiver by using the height constraint condition and predicted pseudorange and Doppler shift values obtained by using the Kalman positioning algorithm. In conclusion, the positioning method using height-constraint-based extended Kalman filter in the present invention mainly includes: a prediction process, an optimum state value estimation process based on the height constraint condition, and a correction process.

Prediction process: States such as a current position of the receiver are predicted by using the prediction formula. Input variables are a final estimated state value $\hat{x}_{k-1}$ of the previous epoch, a mean square error $P_{k-1}$ of the final estimated state value of the previous epoch, and a process noise covariance $Q_{k-1}$, and output variables are a predicted estimated state value $\hat{x}_k^-$ of a current epoch and a mean square error matrix $P_k^-$ of the estimated state value.

$$\hat{x}_k^- = A\hat{x}_{k-1} \quad (8)$$

$$P_k^- = AP_{k-1}A^T + Q_{k-1} \quad (9)$$

Optimum state value estimation process based on the height constraint condition: according to the formulas (2) to (7), estimated state vectors obtained in the prediction process and a position coordinate of the final estimated state value of the previous epoch are converted into differences $(\Delta e, \Delta n, \Delta u)$ between East, North, and Up coordinates of the target to be positioned in the $k^{th}$ epoch and East, North, and Up coordinates of the target to be positioned in the $(k-1)^{th}$ epoch. Therefore, the formula (1) may be simplified as:

$$|U_k - U_{k-1}| \leq \sqrt{\Delta n^2 + \Delta e^2} \cdot \tan\theta \quad (10).$$

An extended Kalman filter complies with a minimum mean square error principle, and may select an optimum estimated value from the formula (1).

$$\hat{x}_k^- = \arg\min_x (x - \hat{x}_k^-)'P_k^-(x - \hat{x}_k^-) \quad (11)$$

$$P_k^- = (x - \hat{x}_k^-)'P_k^-(x - \hat{x}_k^-) \quad (12)$$

In the formula (11), $\hat{x}_k^-$ represents an estimated state value predicted by the Kalman filter, and $P_k^-$ represents a mean square error of the estimated state value. To solve the formula (11), a range of Up coordinates of all estimated state vectors satisfying the formula (10) is divided into sufficient equidistant subintervals, endpoint values of the subintervals are captured to form a series of discrete Up coordinates, a minimum of $P_k^-$ is selected from these discrete points and is used as a mean square error of the optimum estimated value, and in this case, a corresponding estimated state x is recorded as the optimum estimated state $\hat{x}_k^-$.

Correction process: After the received satellite signal is processed by the receiver, the measured satellite ephemeris, pseudorange and Doppler shift values are obtained. A satellite location and speed are obtained by using the satellite ephemeris. The Kalman filter predicts a pseudorange value and a Doppler shift value of the receiver for each satellite. Differences between the predicted values and the measured pseudorange and Doppler shift values form the measured residuals. The optimum estimated state value obtained under the constraint condition is corrected with reference to actual measured values. A Kalman filter gain matrix $K_k$ is deduced by using a minimum diagonal element principle of the mean square error matrix $P_k^\sim$ of the estimated state value, and the optimum estimated value $\hat{x}_k^\sim$ is authenticated by using the actual measured values, so that a mean square error value is smaller, and the reliability is improved. Correction is further performed to obtain the final estimated state value $\hat{x}_k$ and the mean square error matrix $P_k$ of the estimated state value.

$$K_k = P_k^\sim C^T (CP_k^\sim C^T + R)^{-1} \quad (13)$$

$$\hat{x}_k = \hat{x}_k^\sim + K_k(y_k - C\hat{x}_k^\sim) \quad (14)$$

$$P_k = (I - K_k C) P_k^\sim \quad (15)$$

where C represents a relationship matrix between anobserved measurement and a system state, R is a covariance matrix for measuring a noise vector, and $y_k$ is actual observed measurements of a pseudorange and a Doppler shift.

To verify an advantage of the positioning method using height-constraint-based extended Kalman filter in the present invention relative to the prior art, actual paths separately in a scenario in which an altitude slightly changes and in a scenario in which an altitude greatly changes are tested. The measured satellite ephemeris, pseudorange and Doppler shift values required by the Kalman filter positioning are obtained by using a BDStar Navigation C200 receiver baseband and a processing module; and the actual paths are calibrated by using a SPAN-CPT combined navigation system of NovAtel Co., Ltd. In this embodiment, the following methods are compared and analyzed: the conventional extended Kalman filter positioning method is recorded as EKF; a method for combining an altitude barometer and the Kalman filter method is recorded as EKF+altitude barometer; and the positioning method using height-constraint-based extended Kalman filter provided in the present invention is recorded as HCEKF.

Figure 3:
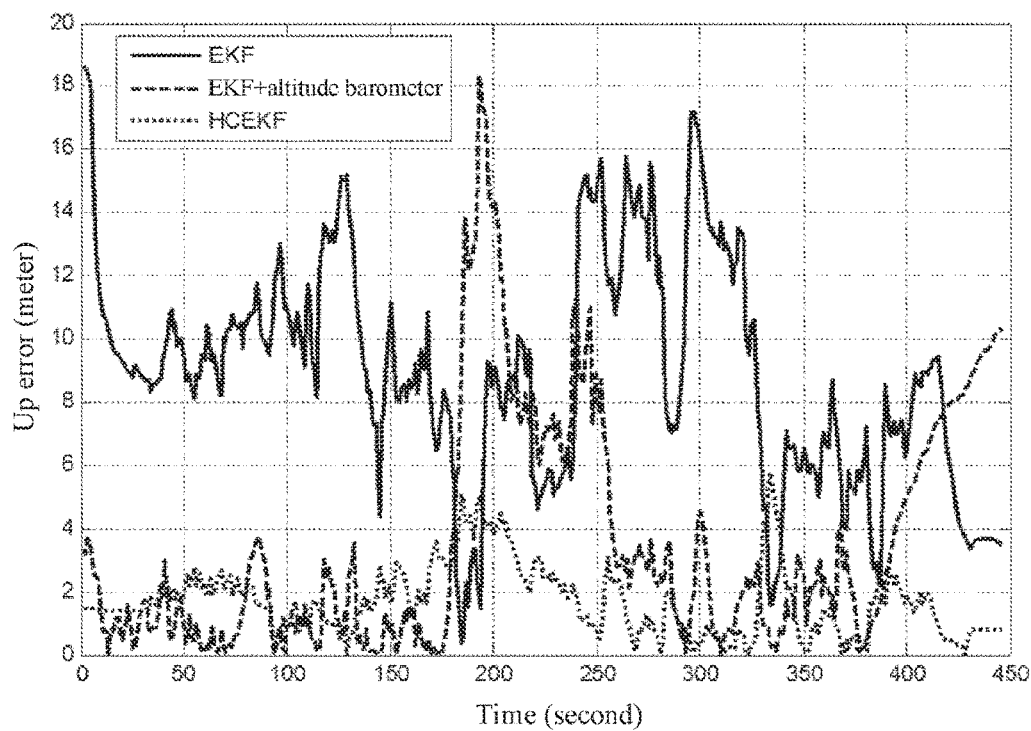
FIG. 3 is a diagram of Up errors of a real moving track, in a scenario in which an altitude slightly changes, under an extended Kalman filter positioning method HCEKF based on a height constraint in the present invention, a conventional Kalman filter EKF, and a fusion algorithm of an altitude barometer and a Kalman filter EKF.
Figure 4:
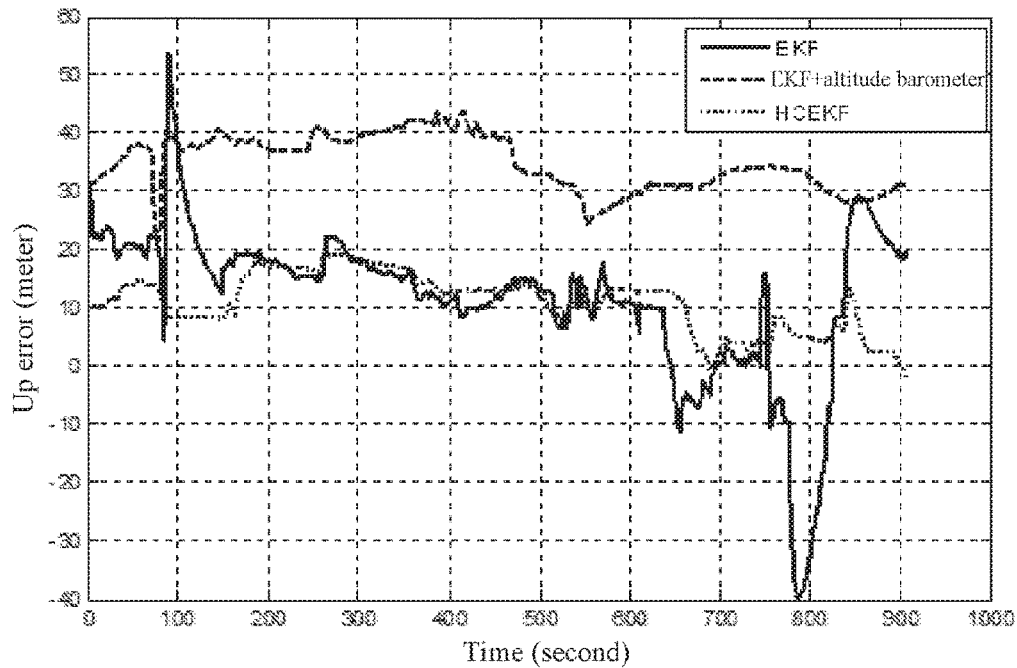
FIG. 4 is a diagram of Up errors of a real moving track, in a scenario in which an altitude greatly changes, under an extended Kalman filter positioning method HCEKF based on a height constraint in the present invention, a conventional Kalman filter EKF, and a fusion algorithm of an altitude barometer and a Kalman filter EKF.

It may be learned from FIGS. 3, 4 that whenever the altitude slightly changes or greatly changes, compared with the conventional extended Kalman filter positioning method EKF and the method for combining an altitude barometer, an Up error in the extended Kalman filter positioning method HCEKF based on a height constraint provided in the present invention is relatively stable, and does not have a sudden change in a whole test period. Therefore, the extended Kalman filter positioning method HCEKF based on a height constraint provided in the present invention can effectively resolve a problem of a great change in an altitude of satellite positioning, and increase the positioning accuracy.

The foregoing is merely description of preferred implementations of the present invention. It should be noted that, a person of ordinary skills in the art may make several improvements and modifications without departing from the principles of the present invention. The improvements and the modifications shall fall within the protection scope of the present invention.

What is claimed is:

1. A positioning method using height-constraint-based extended Kalman filter, comprising the following steps:
   (1) estimating, by using a prediction formula, a prior estimated state value $\hat{x}_k^-$ of a target to be positioned of a current epoch and a mean square error $P_k^-$ of the prior estimated state value of the current epoch from a final estimated state value $\hat{x}_{k-1}$ of a previous epoch and a mean square error $P_{k-1}$ of the final estimated state value of the previous epoch;
   (2) constructing a height constraint condition, and obtaining, by using a minimum mean square error principle, an optimum estimated state value $\hat{x}_k^\sim$ of the current epoch under the height constraint condition and a mean square error $P_k^\sim$ of the optimum estimated state value; and
   (3) correcting, by using a Kalman filter gain matrix $K_k$, the optimum estimated state value $\hat{x}_k^\sim$ of the current epoch and the mean square error $P_k^\sim$ of the optimum estimated state value to obtain a final estimated state value $\hat{x}_k$ of the current epoch and a mean square error matrix $P_k$ of the final estimated state value of the current epoch; wherein the height constraint condition is:

$$|U_k - U_{k-1}| \leq \sqrt{(N_k - N_{k-1})^2 + (E_k - E_{k-1})^2} \cdot \tan\theta$$

wherein $E_k$, $N_k$, and $U_k$ respectively represent East, North, and Up coordinates of the target to be positioned in a $k^{th}$ epoch, $E_{k-1}$, $N_{k-1}$ and $U_{k-1}$ respectively represent East, North, Up coordinates of the target to be positioned in a $(k-1)^{th}$ epoch and $\theta$ is a critical angle.

2. The positioning method using height-constraint-based extended Kalman filter according to claim 1, wherein the prediction formula in the step (1) is:

$$\hat{x}_k^- = A\hat{x}_{k-1}$$

$$P_k^- = AP_{k-1}A^T + Q_{k-1},$$

wherein A is a transfer matrix, and $Q_{k-1}$ is a process noise covariance of the previous epoch.

3. The positioning method using height-constraint-based extended Kalman filter according to claim 2, wherein obtaining the optimum estimated state value $\hat{x}_k^\sim$ of the current epoch under the height constraint condition and the mean square error $P_k^\sim$ of the optimum estimated state value comprises the following steps:
   (31) converting position coordinates of the estimated state value $\hat{x}_k^-$ obtained in the step (2) and the final estimated state value $\hat{x}_{k-1}$ of the previous epoch into differences ($\Delta e$, $\Delta n$, $\Delta u$) between the East, North, and Up coordinates of the target to be positioned in the $k^{th}$ epoch and the East, North, and Up coordinates of the target to be positioned in the $(k-1)^{th}$ epoch;
   (32) converting the height constraint condition into a simplified height constraint condition:

$$|U_k - U_{k-1}| \leq \sqrt{\Delta n^2 + \Delta e^2} \cdot \tan\theta; \text{ and}$$

(33) dividing a range of Up coordinates of all estimated state values satisfying the simplified height constraint condition into several equidistant subintervals, capturing endpoint values of the subintervals to form a series of discrete Up coordinates, obtaining a minimum of mean square errors of the estimated state values from these discrete Up coordinates, recording the minimum as the mean square error $P_k^\sim$ of the optimum estimated state value, and recording a corresponding estimated state value as the optimum estimated state value $\hat{x}_k^\sim$.

4. The positioning method using height-constraint-based extended Kalman filter according to claim 3, wherein a coordinate $X_k$ of an Earth-Centered Earth-Fixed rectangular coordinate system is directly used for calculation in the positioning method, position coordinates of the Earth-Centered Earth-Fixed rectangular coordinate system are labeled as ($X_k[0]$, $X_k[1]$, $X_k[2]$), corresponding geodetic coordinates are (ø, λ,h), and East, North, and Up coordinates are ($E_k$, $N_k$, $U_k$), converting the coordinates ($X_k[0]$, $X_k[1]$, $X_k[2]$) of the Earth-Centered Earth-Fixed rectangular coordinate system into the corresponding East, North, and Up coordinates ($E_k$, $N_k$, $U_k$) comprises the following steps:

(1) converting the coordinates ($X_k[0]$, $X_k[1]$, $X_k[2]$) of the Earth-Centered Earth-Fixed rectangular coordinate system into the geodetic coordinates (ø, λ,h) using following formula:

$$\lambda = \arctan\left(\frac{X_k[1]}{X_k[0]}\right)$$

$$h = \frac{\sqrt{X_k[0]^2 + X_k[1]^2}}{\cos\phi} - N$$

$$\phi = \arctan\left[\frac{X_k[2]}{\sqrt{X_k[0]^2 + X_k[1]^2}}\left(1 - e^2 \frac{N}{N+h}\right)\right];$$

(2) setting an initial value of ø to 0, and calculating values of N, h, and ø by using an iterative algorithm; and (3) converting differences between geodetic coordinates of the target to be positioned in the $k^{th}$ epoch and geodetic coordinates of the target to be positioned in the $(k-1)^{th}$ epoch into the differences between the East, North, and Up coordinates of the target to be positioned in the $k^{th}$ epoch and the East, North, and Up coordinates of the target to be positioned in the $(k-1)^{th}$ epoch:

$$\Delta e = \Delta\lambda \cdot a \cdot \cos\phi$$

$$\Delta n = \Delta\phi \cdot a$$

$$\Delta u = \Delta h$$

wherein a is a major radius of a reference ellipsoid, (Δø, Δλ, Δh) are the differences between the geodetic coordinates of the target to be positioned in the $k^{th}$ epoch and the geodetic coordinates of the target to be positioned in the $(k-1)^{th}$ epoch, and (Δe, Δn, Δu) are the differences between the East, North, and Up coordinates of the target to be positioned in the $k^{th}$ epoch and the East, North, and Up coordinates of the target to be positioned in the $(k-1)^{th}$ epoch.

* * * * *